US008540505B2

(12) United States Patent
Farr et al.

(10) Patent No.: US 8,540,505 B2
(45) Date of Patent: Sep. 24, 2013

(54) CORE-SHELL SOLID FREEFORM FABRICATION SYSTEM

(75) Inventors: Isaac Farr, Corvallis, OR (US); Terry M. Lambright, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 190 days.

(21) Appl. No.: 12/891,185

(22) Filed: Sep. 27, 2010

(65) Prior Publication Data

US 2011/0076438 A1 Mar. 31, 2011

Related U.S. Application Data

(62) Division of application No. 11/066,963, filed on Feb. 25, 2005, now Pat. No. 7,829,000.

(51) Int. Cl.
*B29C 31/10* (2006.01)
*B29C 35/08* (2006.01)
*B29C 67/00* (2006.01)

(52) U.S. Cl.
USPC ........ 425/375; 425/130; 425/174.4; 425/218; 264/109; 264/113; 264/128; 264/494

(58) Field of Classification Search
None
See application file for complete search history.

(56) References Cited

U.S. PATENT DOCUMENTS

| | | |
|---|---|---|
| 4,892,742 A | 1/1990 | Shah |
| 5,030,474 A | 7/1991 | Saita et al. |
| 5,932,059 A | 8/1999 | Langer et al. |
| 6,120,803 A | 9/2000 | Wong et al. |
| 6,322,728 B1 | 11/2001 | Brodkin et al. |
| 6,363,606 B1 | 4/2002 | Johnson, Jr. et al. |
| 6,471,992 B1 | 10/2002 | Yoo et al. |
| 6,623,687 B1 | 9/2003 | Gervasi et al. |
| 6,780,368 B2 | 8/2004 | Liu et al. |
| 6,808,659 B2 | 10/2004 | Schulman et al. |
| 6,821,462 B2 | 11/2004 | Schulman et al. |
| 6,830,643 B1 | 12/2004 | Hayes |
| 6,993,406 B1 | 1/2006 | Cesarano et al. |
| 2002/0015728 A1 | 2/2002 | Payumo et al. |
| 2002/0167101 A1 | 11/2002 | Tochimoto et al. |
| 2003/0107158 A1 | 6/2003 | Levy |
| 2003/0173695 A1 | 9/2003 | Monkhouse et al. |
| 2004/0024470 A1 | 2/2004 | Giordano et al. |
| 2004/0222549 A1* | 11/2004 | Sano et al. ............... 264/128 |

FOREIGN PATENT DOCUMENTS

| | | |
|---|---|---|
| WO | 9713503 A1 | 4/1997 |
| WO | 2004010907 | 2/2004 |

OTHER PUBLICATIONS

"Build Parts by Printing"; Design Engineering; Morgan-Grampian LTD.; Oct. 1997; London, GB; p. 17; XP000720186; ISSN: 0308-8448.
International Search Report for Application No. PCT/US2006/006648. Report Issued May 29, 2006.

* cited by examiner

*Primary Examiner* — Benjamin Schiffman

(57) ABSTRACT

A method for creating a three-dimensional solid freeform fabrication object includes spreading a reactive powder on a substrate, selectively dispensing a core binder in the reactive powder to form a core material, and selectively dispensing a shell binder in the reactive powder to form a shell on the core material.

15 Claims, 5 Drawing Sheets

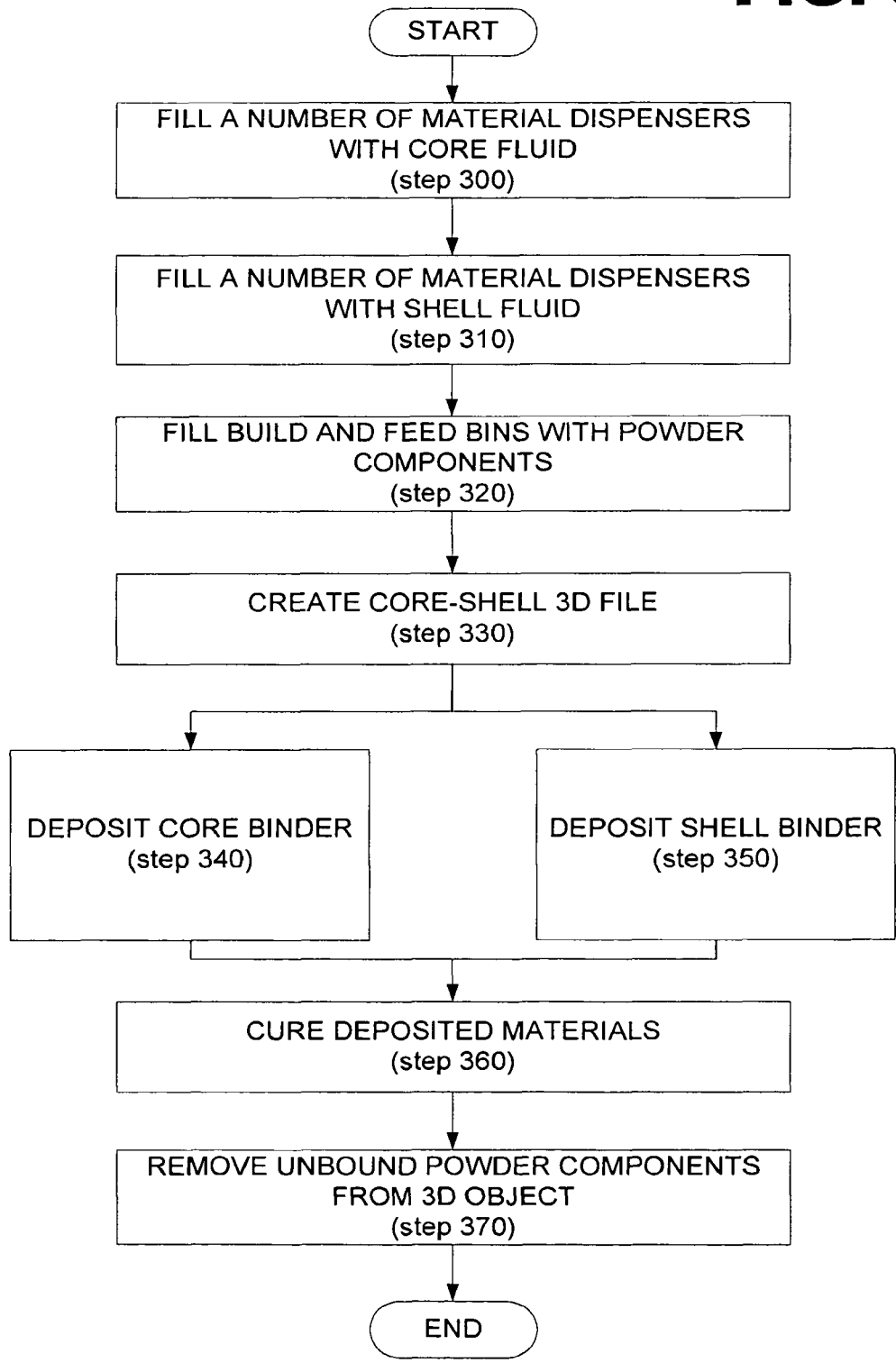

CORE-SHELL SOLID FREEFORM FABRICATION SYSTEM

RELATED APPLICATIONS:

The present application is a divisional application, and claims the priority under 35 U.S.C. §120, of previous U.S. patent application Ser. No. 11/066,963, filed Feb. 25, 2005, which is now U.S. Pat. No. 7,829,000 and is incorporated herein by reference in its entirety.

BACKGROUND

Solid freeform fabrication (SFF) is a process whereby three-dimensional objects, for example, prototype parts, models, working tools, production parts, molds, and other articles are manufactured. Computer aided design (CAD) is commonly used to automate the design process. Using a suitable computer, an operator may design a three-dimensional article and then create that object by the use of a positionable ejection head that selectively emits a desired material. While many methods have been developed to manufacture SFF objects according to the above principles, two methods have traditionally been preferred for manufacturing SFF objects: powder/binder interaction to create a solid object, and the use of jetted curable photopolymers to create a solid object.

Powder/binder interaction forming methods include the selective deposition of a binder onto powder constituents. Once deposited, the powder constituents react with the binder to create a solid object. Jetted photopolymer forming methods include the selective deposition of both build and support material from a dispenser onto a substrate where the two materials subsequently solidify.

Traditional powder-based methods and materials demand that a compromise be made between surface finish and flexural strength of the resulting SFF object. That is, traditional powder-based methods and materials that produce a smooth three-dimensional object typically have low flexural strength. Conversely, when high flexural strength is sought using traditional powder-based methods and materials, the resulting surface is rough.

SUMMARY

A method for creating a three-dimensional solid freeform fabrication object includes spreading a reactive powder on a substrate, selectively dispensing a core binder in the reactive powder to form a core material, and selectively dispensing a shell binder in the reactive powder to form a shell on the core material.

BRIEF DESCRIPTION OF THE DRAWINGS

The accompanying drawings illustrate various embodiments of the present system and method and are a part of the specification. The illustrated embodiments are merely examples of the present system and method and do not limit the scope thereof.

FIG. 3 is a flow chart illustrating a method for performing the present method using a one-part reactive material according to one exemplary embodiment.

Throughout the drawings, identical reference numbers designate similar, but not necessarily identical, elements.

DETAILED DESCRIPTION

A method and apparatus for performing a core-shell solid freeform fabrication is described herein. More specifically, a three-dimensional object having both high flexural strength and a smooth surface finish may be formed by decoupling the strength and smoothness functions into a core-shell structure. Specifically, a core region of a formed object may be formed of a polymerizable acrylate that provides flexural strength to the three-dimensional object. Further, a water based shell region may be formed on the core region to enhance surface finish of the resulting three-dimensional object. Further details of the present core-shell printing technique, as well as a printing apparatus and exemplary core-shell formulations will be provided in further detail below.

As used in this specification and in the appended claims, the term "binder" is meant to be understood broadly as any material used to bind separate particles together or facilitate adhesion to a surface. Additionally, the term "substrate" is meant to be understood as any build platform, removable material, or previously deposited reactive or powder material. A "build platform" is typically the rigid substrate that is used to support deposited material from an SFF apparatus. Similarly, the term "curing" is meant to refer to the process of solidifying a material to form a solid three-dimensional object.

In the following description, for purposes of explanation, numerous specific details are set forth in order to provide a thorough understanding of the present system and method for performing a core-shell solid freeform fabrication. It will be apparent, however, to one skilled in the art that the present method may be practiced without these specific details. Reference in the specification to "one embodiment" or "an embodiment" means that a particular feature, structure, or characteristic described in connection with the embodiment is included in at least one embodiment. The phrase "in one embodiment" in various places in the specification is not necessarily all referring to the same embodiment.

Exemplary Structure

Figure 1:
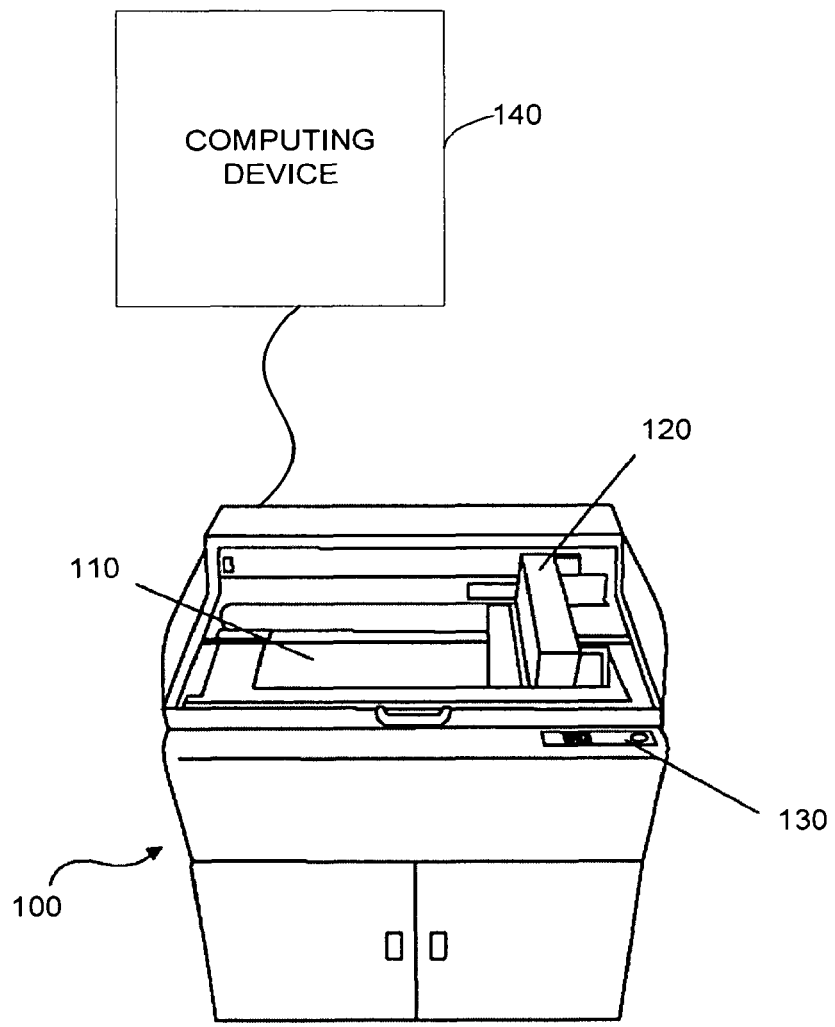
FIG. 1 is a perspective view of a solid freeform fabrication system that may be used to implement exemplary embodiments of the present system and method.

FIG. 1 illustrates a solid freeform fabrication system (100) that may incorporate the present method of jetting reactive materials for powder-based SFF. As shown in FIG. 1, a solid freeform fabrication system may include a fabrication bin (110), a moveable stage (120), and a display panel (130) including a number of controls and displays.

The fabrication bin (110) shown in FIG. 1 may be configured to receive and facilitate the building of a desired three-dimensional object on a substrate. The building of the desired three-dimensional object may require the spreading of a powder and the selective dispensing of a number of binders. While the solid freeform fabrication system (100) illustrated in FIG. 1 is shown as a single, stand-alone, self-contained freeform fabrication system, the present core-shell SFF system and methods may be incorporated into any freeform fabrication system that utilizes powder-based methods, regardless of the structure or configuration of the freeform fabrication system.

The moveable stage (120) of the solid freeform fabrication system (100) illustrated in FIG. 1 is a moveable material dispenser that may include any number of inkjet material dispensers configured to dispense liquid binder material. The moveable stage (120) may be controlled by a computing device (140) and may be controllably moved by, for example, a shaft system, a belt system, a chain system, etc. As the moveable stage (120) operates, the display panel (130) may inform a user of operating conditions as well as provide the user with a user interface. As a desired three-dimensional object is formed, a computing device may controllably position the moveable stage (120) and direct one or more of the dispensers to controllably dispense liquid binder material at predetermined locations within the fabrication bin (110) thereby forming a desired three-dimensional object. The inkjet material dispensers used by the solid freeform fabrication system (100) may be any type of inkjet dispenser configured to perform the present method including, but in no way limited to thermally actuated inkjet dispensers, mechanically actuated inkjet dispensers, electrostatically actuated inkjet dispensers, magnetically actuated dispensers, piezoelectrically actuated dispensers, continuous inkjet dispensers, etc. Additionally, the ink-jet printhead dispenser can be heated to assist in dispensing viscous chemical compositions. For example, the ink-jet printhead dispenser may be heated up to about 200° C., and preferably in the range of 70 to 120° C. A more demonstrative cross-sectional view of the SFF apparatus of FIG. 1 is presented in FIG. 2.

Figure 2:
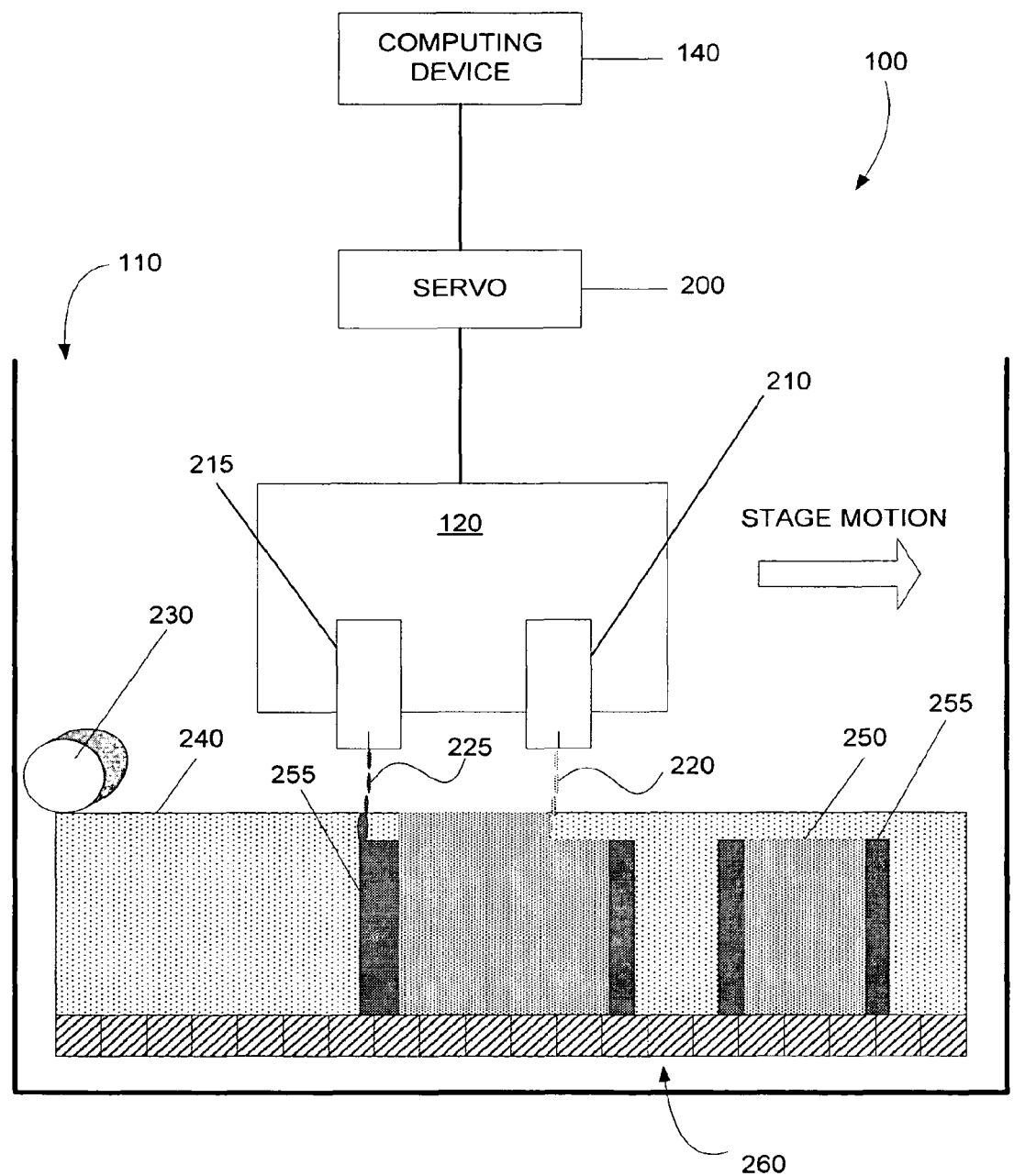
FIG. 2 is a cross-sectional view of a solid freeform fabrication system that may be used to implement exemplary embodiments of the present system and method.

As shown in FIG. 2, the computing device (140) may be communicatively coupled to a servo mechanism (200). The computing device (140) may be configured to communicate commands to the servo mechanism (200) causing it to selectively position the moveable stage (120). A core material dispenser (210) and a shell material dispenser (215) may be coupled to the moveable stage (120) and to a number of material reservoirs (not shown). Once positioned by the servo mechanism (200), the core material dispenser (210) may eject a core binder (220) supplied by a core binder material reservoir (not shown). Similarly, when appropriately positioned by the servo mechanism (200), the shell material dispenser (215) may selectively eject shell binder (225) supplied by a shell binder material reservoir (not shown) into a powder component (240). According to one exemplary embodiment, both the core binder (220) and the shell binder (225) have a "jettable" viscosity (<70 cps) at an operating temperature below approximately 200 degrees Celsius to enable selective dispensing from any number of inkjet material dispensers. Additionally, according to one exemplary embodiment, the core binder (220) and the shell binder (225) are selected to have a fairly fast reaction rate (gelling within seconds/minutes) when activated or mixed. Exemplary reactive chemistries will be described in further detail below.

FIG. 2 also illustrates the components of the present system that may be used to receive the core binder (220) and the shell binder (225) to aid in the formation of a desired three-dimensional object. As shown in FIG. 2, the fabrication bin (110) of the solid freeform fabrication system (100) may include a substrate (260) having a powder component (240) disposed thereon. The powder component (240) may be dispensed on the substrate (260) in bulk quantities from a powder reservoir (not shown) and planarized to a desired thickness with the use of a mechanical roller (230). Control of the mechanical roller (230) may be performed by the servo mechanism (200) to controllably deposit and planarize the powder component (240) on the substrate (260). The powder component (240) dispensed on the substrate (260) may include, but is in no way limited to, calcium phosphate, calcium sulfate, fast setting cement, a polymerization initiator, or any other powder component configured to react with at least one of the shell binder (225) or the core binder (220).

Once the reactive binder (220) is dispensed in the layer of powder component (240), a core material (250) or shell material (255) exists on the substrate (260) that defines a desired three-dimensional object. A number of exemplary compositions of the above-mentioned binders and powders will be given below followed by a description of an exemplary system and method for using the solid freeform fabrication system (100) with reference to FIG. 3 through FIG. 4B.

Exemplary Composition

As mentioned previously, the present exemplary system and method for producing a powder-based three-dimensional object having both flexural strength and a smooth surface finish includes a number of reactive components. According to one exemplary embodiment, the present exemplary system includes, at least, a powder component (240), a core binder (220), and a shell binder (225). Each of the above-mentioned components will be described in detail herein.

As mentioned previously, the substrate (260) of the fabrication bin (110) is coated with a layer of powder component (240) configured to receive and react with a shell binder (225) and a core binder (220). According to one exemplary embodiment, the powder component (240) may include, but is in no way limited to, fast-setting cement particles, a polymerization initiator, reaction accelerators/retarders, pH modifiers, and/or strengthening agents.

According to one exemplary embodiment, the fast-setting cement particles incorporated by the present exemplary embodiment are selected to fixedly react with the desired shell binder (225) and the core binder (220). Depending on the binders selected, the cement forming base particle may include, but is in no way limited to, calcium phosphate based particles, calcium sulfate based particles, or other fast-setting cement based particles.

A polymerization initiator in the form of a radical source or radical former may also be included in the present powder component (240) in order to facilitate the reaction between the powder component and a binder. The radical source may be chemically or light activated and may include, but is in no way limited to, peroxide plus an amine, benzophenone or UV/blue light initiator. Additionally, a polymerization initiator that is activated at room temperature may also be incorporated by the present exemplary system.

Moreover, reaction accelerators/retarders may be included in the present powder component (240). These reaction accelerators/retarders may include, but are in no way limited to, pH modifiers that increase or decrease the pH of the system thereby affecting the rate of reaction and curing time of the resulting three-dimensional object. Specifically, the inclusion of citric acid in the present powder component (240) may accelerate a re-precipitation setting mechanism. The pH modifiers included in the present cement forming particulate blend (240) may include, but are in no way limited to one or more of the following: tartaric acid, citric acid, glutamic acid, diglycolic acid, DL aspartic acid, iminodiacetic acid, itaconic acid, and NH4H2PO4.

Strengthening agents such as nanocomposites may also be included in the present powder component (240). The nanocomposites may include, but are in no way limited to one or more of the following: PEO/clay nanocomposites, hydroxyapatite nanocomposites, layered double hydroxide (LDH) nanocomposites and organophillic nanocomposites. Typical nanocomposites not only act as reinforcing agents, they may also act as moisture reservoirs in the desired three-dimensional object to add structural support and to prevent moisture loss which may result in drying or cracking of the produced three-dimensional object.

A second component of the present exemplary system is a core binder (220). According to one exemplary embodiment, the core binder includes a polymerizable/crosslinkable fluid configured to react with the powder component (240) to provide high flexural strength to the resulting three-dimensional object. According to one exemplary embodiment, the polymerizable/crosslinkable fluid includes an acrylate configured to react with a fast-setting cement such as calcium phosphate or calcium sulfate. According to one exemplary embodiment, the polymerizable/crosslinkable fluid rapidly diffuses and binds with the powder component (240). While creating a resulting object with high flexural strength, the core binder (220) also results in a substantially rough surface finish.

Consequently, a third component of the present exemplary system is a shell binder (255) configured to provide a smooth surface finish to the resulting three-dimensional object. According to one exemplary embodiment, the shell binder (255) may be an aqueous fluid configured to provide a smooth surface finish. According to one exemplary embodiment, the shell binder (255) includes a phosphoric acid.

Further, the core binder (220) and/or the shell binder (255) may also include, but is in no way limited to, pH modifiers, and one or more of the following: dye, pigment colorants, wetting agents, viscosity modifying agents, surfactants, UV-radical formers, and co-initiators.

Potential of Hydrogen (pH) modifiers may be added to the binders (220, 225) in order to decrease the pH of the system which subsequently increases the rate of reaction and decreases the curing time of the resulting three-dimensional object. The pH modifiers included in the present binders may include, but are in no way limited to, phytic acid, itaconic acid, diglycolic acid, mineral acid (phosphoric acid), etc.

Additionally, dye colorants and pigment colorants may be added to the binder (220, 225) in order to produce a three-dimensional object of one or more colors. The dye colorants and pigment colorants may be a single color equally distributed in the binders (220, 225) or they may be multiple colors housed in separate material reservoirs (not shown).

Wetting agents may also be included in the above-mentioned binders in order to facilitate wetting of the present powder component (240) as well as to bring a number of components in the powder component into solution to facilitate reaction. Wetting agents that may be included in the present binder formulations include, but are in no way limited to, water. Water may be used due to its low cost and efficiency in wetting cement forming powders.

Further, the binders illustrated above (220, 225) may also be jettable from an inkjet dispenser, according to one exemplary embodiment. Consequently, the present core and shell binders (225, 220) may include surfactants and viscosity modifiers to improve jettability including, but in no way limited to, surfynol 465.

UV radical formers and co-initiators may also be added to the binders (220, 225). The UV radical formers and co-initiators may be added to the binders (220, 225) in order to facilitate the polymerization setting mechanism. The radical formers may be either chemically or light activated and may include, but are in no way limited to, peroxide plus an amine, benzophenone or UV/blue light initiator.

According to one exemplary embodiment, the above-mentioned components may be combined, according to a first embodiment, as a system having a powder component (240) including calcium phosphate and a polymerization initiator, a core binder (220) that includes an acrylate, and a shell binder (225) that includes a phosphoric acid. According to a second exemplary embodiment, the powder component (240) may include a calcium sulfate and a polymerization initiator, the core binder (220) may include an acrylate, and the shell binder may include an aqueous fluid. An example tested formulation for each component of the present system and method for SFF is provided as an example below.

Exemplary Implementation and Operation

FIG. 3 is a flow chart illustrating an exemplary method for operating the solid freeform fabrication system (100; FIG. 2) illustrated in FIG. 2 incorporating a core-shell structure, according to one exemplary embodiment. For ease of explanation only, the present system and method will be described within the context of incorporating a number of binders including a UV curable initiator. The binders may be jetted into a powder component (240) and subsequently cured due to the application of UV radiation. As illustrated in FIG. 3, the present method may begin by first filling a number of material dispenser reservoirs with core binder (step 300). Once the desired material reservoirs are filled with the desired core binder (step 300), a number of other material reservoirs are filled with shell binder (step 310). When all the desired reservoirs are filled and ready to jet the fluids onto a powder base, the powder components of the present exemplary system and method are placed in the fill and feed bins of the SFF system (step 320). A core-shell three-dimensional file is created on the computing device (step 330) and used to selectively deposit the core (step 340) and shell (step 350) materials onto the powder components. According to one exemplary embodiment, the deposition of the core (step 340) and the shell (step 350) materials onto the powder components may occur in any order or simultaneously. Once the desired core and shell materials have been satisfactorily deposited onto the layer of powder components, the deposited materials are cured (step 360) and the unbound powder components that surround the resulting three-dimension object are removed (step 370) resulting in the desired three-dimensional object. Each of the above-mentioned steps of FIG. 3 will now be explained in detail with reference to FIGS. 4A through 4B.

As shown in the flow chart of FIG. 3, the present method begins by filling a number of material dispenser reservoirs with core binder (step 300), and additional material dispensers with shell binder (step 310). According to one exemplary embodiment, the material dispenser reservoirs that are filled with the core binder and the shell binder may be on-axis reservoirs, off-axis reservoirs, single chamber reservoirs, or partitioned reservoirs configured to receive and chemically isolate multiple binder materials. Additionally, if the three-dimensional object to be formed includes a great deal of core area and a relatively small amount of shell area, a higher number of material dispensers may be designated as core material dispenser (210) with their associated material reservoirs. Conversely, if there is little core area and a relatively large amount of shell area on the desired three-dimensional object, a higher number of material dispensers may be designated as shell material dispensers to reduce formation time.

Figure 4A:
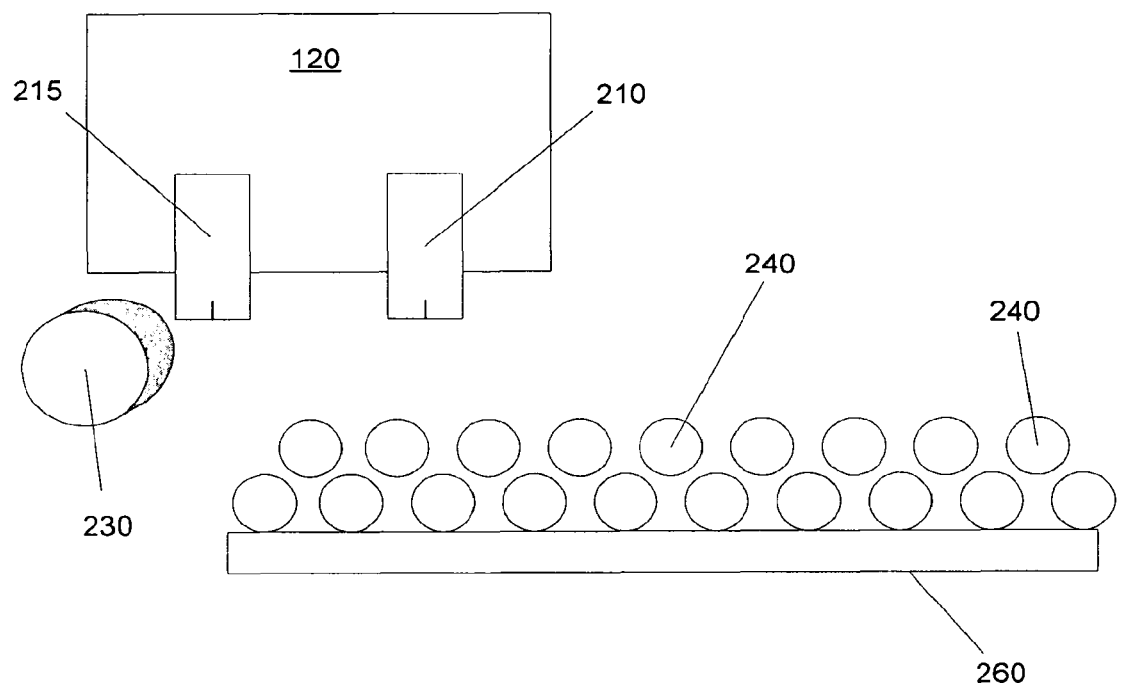
FIG. 4A is a cross-sectional view illustrating a powder that may be used by the present method, according to one exemplary embodiment.

With the material dispenser reservoirs filled, the build and feed bins may be filled with the powder components (step 320). FIG. 4A illustrates a bin containing a layer of powder component (240) distributed on the substrate (260). As illustrated, the mechanical roller (230) may spread and pack a thin layer of powder component (240) on the substrate (260). First, a predetermined amount of powder component (240) is deposited on the substrate (260) from a powder reservoir (not shown). Once deposited, the mechanical roller (230) packs and spreads a quantity of the powder component. The amount of powder component (240) that remains on the substrate (260) after the mechanical roller (230) has spread and packed a thin layer corresponds to the distance between the mechanical roller (230) and the substrate (260) if no material deposition operations have been performed. Similarly, if a number of material deposition operations have previously been performed, the amount of powder component (240) that remains on the substrate (260) after a roller operation corresponds to the distance between the mechanical roller (230) when it performs its spreading and packing operation and the previously cured material. The amount of powder component (240) deposited by the mechanical roller (230) may be adjusted by the servo mechanism (200; FIG. 2) and optimized to correspond to the material ejection rates of the core and shell material dispensers (210, 215).

Once a layer of powder component (240) has been spread and packed by the mechanical roller (step 320; FIG. 3), a core-shell three-dimensional file may be created (step 330; FIG. 3). According to one exemplary embodiment, the core-shell three-dimensional file contains a number of servo and material dispenser commands configured to cause the SFF system (100; FIG. 2) to selectively dispense the shell binder (225; FIG. 2) and the core binder (220; FIG. 2) in desired areas of the powder component (240).

Figure 4B:
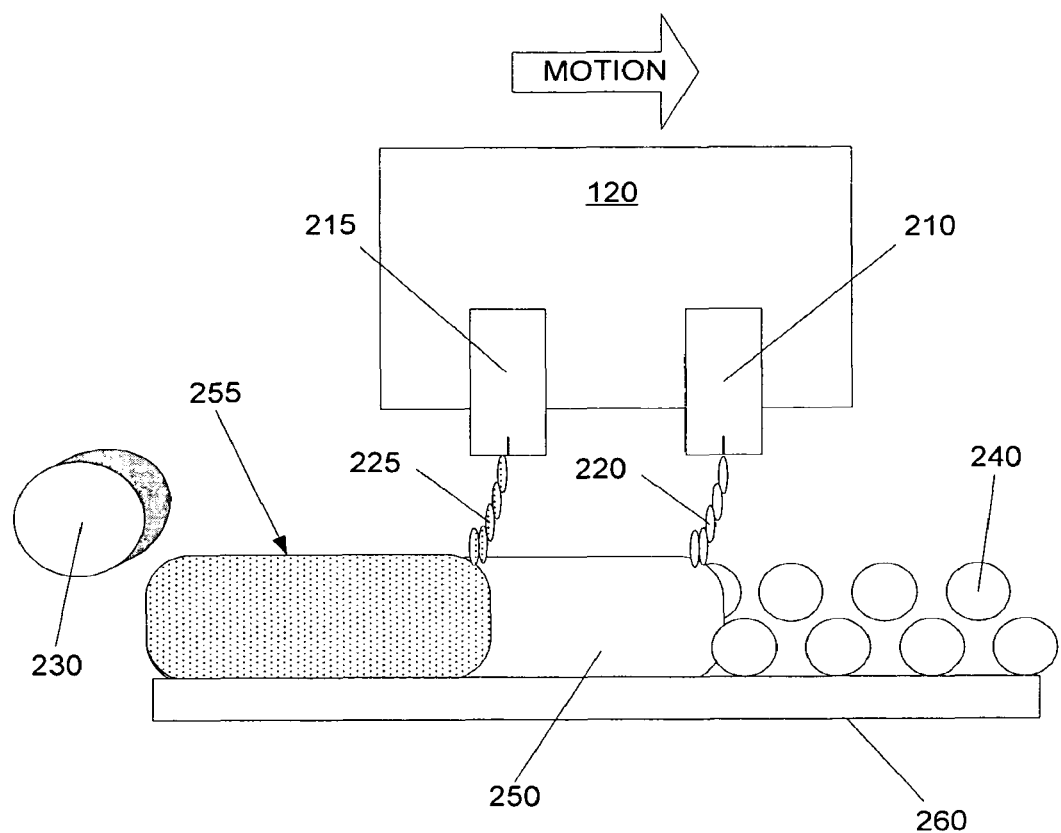
FIG. 4B is a cross-sectional view showing the deposition of a core and a shell material into the powder material, according to one exemplary embodiment.

With the three-dimensional file created, the SFF system (100; FIG. 2) may access the three-dimensional file to control the selective deposition of the core binder (step 340; FIG. 3) and the shell binder (step 350; FIG. 3). As illustrated in FIG. 4B, the moveable stage (120) and consequently the core material dispenser (210) and the shell material dispenser (215) may be controllably positioned by the computing device (140; FIG. 2) and the servo mechanism (200) adjacent to the powder component (240). When the movable stage (120) is in a desired location, as directed by the three-dimensional file, the core material dispenser (210) and/or the shell material dispenser (215) is actuated to dispense a pre-determined quantity of the core binder (220) or shell binder (225) respectively.

As is shown in FIG. 4B, when the core binder (220) or the shell binder (225) is dispensed by respective material dispensers onto the layer of powder component (240), the respective binder wets and reacts with the surface of the powder component (240). This mixture (420) of binders (220, 225) and powder component (240) defines the cross-section of the desired three-dimensional object. When sufficient core binder (220) or shell binder (225) has been deposited on a layer of powder component (240) to wet a portion of the powder component designated by the core-shell three-dimensional file, the moveable stage (120) is translated to selectively deposit binder onto other areas of the powder component as indicated by the "motion" arrow.

According to one exemplary embodiment, the binder (220, 225) deposition may be performed on a layer-by-layer process or in a single bulk dispensing process. More specifically, according to one exemplary embodiment, the above-mentioned steps of dispensing a powder component (240) onto the substrate (step 320; FIG. 3), depositing a core binder (step 340; FIG. 3), and selectively depositing a shell binder (step 350; FIG. 3) onto the powder component may be performed in multiple iterations. First a desired quantity of powder component (240) is dispensed on the substrate (260), and then the two binders (220, 225) are selectively deposited onto the powder component as directed by the core-shell three-dimensional model. Subsequently, another layer of powder component (240) may be dispensed over the recently deposited binder, and the process begins again to form a multi-layered three-dimensional object. As mentioned previously, the two binders (220, 225) may be dispensed in any order or simultaneously.

Alternatively, a single bulk dispensing process may be performed wherein a single quantity of powder component (240) is distributed over the substrate (260). Subsequently, a sufficient amount of core binder (220) and shell binder (225) are selectively dispensed into the powder component (240) to bind a desired amount of the powder component (240). According to this exemplary embodiment, the core and shell binders (220, 225) are dispensed on the surface of the powder component (240) and are allowed to diffuse therein to form the desired three-dimensional object.

According to one exemplary embodiment, the interaction of the two materials may be dependant upon a number of factors including, but in no way limited to, the viscosity of the binder materials (220, 225). Accordingly, an optional step may be performed of applying ultrasonic energy to the deposited materials. According to this optional step, an ultrasonic transducer (not shown) or other similar element may form a part of the SFF system (100; FIG. 2) to provide the ultrasonic energy. The application of ultrasonic energy may facilitate the interaction of the two materials.

Once the deposited binders (220, 225) have sufficiently "interacted" with the powder component (240), the combination may be cured (step 360) through the application of ultraviolet (UV) or other radiation energy. According to one exemplary embodiment, the deposited materials may be cured by exposing them to a light emitter configured to emit a known wavelength of light. According to one exemplary embodiment, the light emitter may emit any number of wavelengths of light including, but in no way limited to, visible light or UV radiation. When UV (or other) radiation energy from a known wavelength of light is applied to the binder and resin combination, the added energy initiates polymerization, to form a solid matrix. Alternatively, a thermal applicator may be used to provide thermal energy to facilitate curing of the deposited materials, or the dispensed material may be allowed to cure naturally over time in a desired atmosphere. According to one exemplary embodiment, the above-mentioned curing step (step 360; FIG. 3) may be performed after one or more passes if the SFF system (100; FIG. 2) is operating in according to a layer-by-layer process.

The UV or other radiation energy in the form of a known wavelength of light may be supplied to the deposited binders by a UV or other light emitter. The light emitter may be any device configured to apply ultraviolet (UV) or other radiation energy sufficient to initiate polymerization in the deposited binders. The light emitter may be a separate light exposer or scanning unit configured to flood expose all or selective portions of the deposited binder. Alternatively, the light emitter may be coupled to the moveable stage (120) as a scanning unit.

Once the desired binders (220, 225) have been properly cured (step 360; FIG. 3), the unbound powder components present in the fabrication bin (110; FIG. 1) are removed from the formed three-dimensional object. As illustrated in FIG. 3, the removal of the unbound powder components reveals the three-dimensional object. As shown, the core material (250) that adds flexural strength to the resulting three-dimensional object has a somewhat irregular surface finish. However, the shell material (255) is coupled to the irregular interface of the core material (250) thereby providing a smooth surface finish while maintaining the flexural strength of the core material (250).

According to one exemplary embodiment, the smooth surface finish of the shell material (255) provides an improved surface to receive a post-process coating. More specifically, the erratic surface of the core binder (220) may make it difficult to provide an even post-process coating onto a formed three-dimensional object. However, the present exemplary system and method for coating the core (250) with a smooth shell material (255) provides a readily accessible medium for coatings. More specifically, the three-dimensional object may be coated with a post-processing coating such as, but in no way limited to, paint, a corrosion resistant coating, or application specific coatings. An exemplary formulation of the present system and method will be given below.

EXAMPLE

The above-mentioned system and method was used to form a three-dimensional object having a structural core and a surface finish provided by a shell material. Table 1 below illustrates the composition of the acrylic core binder used:

TABLE 1

| Component | Percent by Weight |
|---|---|
| Water | 12.03 |
| Hema | 38.01 |
| GDMA | 14.77 |
| 4-DMAB | 4.86 |
| CQ | 0.48 |
| Lucirin TPO | 0.48 |
| t-BHT | 0.01 |
| Ethanol | 29.36 |
| Total | 100.00 |

Further, a phosphoric acid shell binder was produced. The formulation used is illustrated below in Table 2:

TABLE 2

| Component | Percent by Weight |
|---|---|
| H3PO4 | 5.88 |
| 2-P | 3.00 |
| LEG-1 | 5.00 |
| Surfynol 465 | 0.75 |
| Water | 78.87 |
| 1,5-pentanediol | 5.50 |
| Tergitol-15-S-7 | 1.00 |
| Total | 100.00 |

Lastly, a tetracalcium phosphate powder was generated, whose formulation is illustrated below in Table 3:

TABLE 3

| Component | Percent by Weight |
|---|---|
| TTCP | 71 |
| Citric Acid | 5 |
| PAA (60K) | 10 |
| $Li_3PO_4$ | 10 |
| $MgF_2$ | 3 |
| Benzoyl Peroxide | 1 |
| Total | 100 |

Once the above-mentioned formulations were generated, three of four pens on a thermal inkjet material dispenser were filled with the jettable acrylate illustrated in Table 1 and a single pen was loaded with the phosphoric acid solution illustrated in Table 2. Once filled, the build and feed bins of a SFF system were filled with the tetracalcium phosphate powder of Table 3. A core-shell (or internal-external geometry) three-dimensional file was created to print a desired object. The part was then printed using the thermal inkjet material dispenser. During printing, the three acrylate pens jetted material into the core region of the part and one phosphoric acid pen was used to create the shell or cosmetic skin over the rough rapidly diffusing acrylate binder. On a binder to powder volume basis, approximately 10% phosphoric acid was deposited to form the shell and approximately 30% acrylate binder was dispensed to form the core. The resulting three-dimensional object was then allowed to cure resulting in a smooth yet strong three-dimensional object.

In conclusion, the present solid freeform fabrication system and method effectively allow for the production of three dimensional objects having both flexural strength and a smooth surface finish. By decoupling the strength and smoothness functions into a core-shell structure, the present exemplary system and method may provide both flexural strength and a smooth surface finish. Specifically, a core region of a formed object may be formed of a polymerizable acrylate that provides flexural strength to the three-dimensional object. Further, a water based shell region may be formed on the core region to enhance surface finish of the resulting three-dimensional object. As a result, the three-dimensional object produced will have better mechanical properties than would have been produced by traditional methods because containment of the reaction prevents swelling, dissolution, and re-deposition.

The preceding description has been presented only to illustrate and describe exemplary embodiments of the present system and method. It is not intended to be exhaustive or to limit the present system and method to any precise form disclosed. Many modifications and variations are possible in light of the above teaching. It is intended that the scope of the present system and method be defined by the following claims.

What is claimed is:

1. A solid freeform fabrication system for producing a three-dimensional object comprising:
a powder spreading system configured to spread a specified quantity of reactive powder;
a dispensing system adapted to selectively dispense both a core binder and a shell binder onto said reactive powder, said dispensing system comprising a reservoir of said core binder and a separate reservoir of said shell binder, wherein said core binder is configured to react differently with said reactive powder so as to bind said powder with more flexural strength than said shell binder, and wherein said shell binder is configured to react differently with said reactive powder to as to provide a smoother surface finish than would said core binder;
a curing system configured to cure said binder and reactive powder; and
a computing device coupled to and configured to control said dispensing system and said curing system, wherein said computing device is programmed to selectively apply said shell binder to portions of said reactive powder which will be located at a surface of said three-dimensional object and to selectively apply said core binder to portions of said reactive powder that will be encased in a shell of said three-dimensional object that is formed by said shell binder.

2. The solid freeform fabrication system of claim 1, wherein said powder spreading system comprises a mechanical roller.

3. The solid freeform fabrication system of claim 2, wherein said mechanical roller is configured to planarize and pack a quantity of said reactive powder.

4. The solid freeform fabrication system of claim 1, wherein said dispensing system comprises at least one inkjet dispenser.

5. The solid freeform fabrication system of claim 4, wherein said inkjet dispenser comprises one of a thermally actuated inkjet dispenser, a mechanically actuated inkjet dispenser, an electrostatically actuated inkjet dispenser, a magnetically actuated dispenser, a piezoelectrically actuated dispenser, or a continuous inkjet dispenser.

6. The solid freeform fabrication system of claim 4, wherein said inkjet dispenser comprises a plurality of material reservoirs configured to chemically separate a core binder and a shell binder.

7. The solid freeform fabrication system of claim 1, wherein said shell binder comprises an aqueous fluid.

8. The solid freeform fabrication system of claim 1, wherein said reactive powder comprises a polymerization initiator and a fast-setting cement.

9. The solid freeform fabrication system of claim 8, wherein said fast-setting cement comprises one of a calcium phosphate or a calcium sulfate.

10. The solid freeform fabrication system of claim 1, wherein said core binder comprises an acrylate.

11. The solid freeform fabrication system of claim 1, wherein said reactive powder comprises one of a calcium phosphate or a calcium sulfate.

12. The solid freeform fabrication system of claim 1, wherein said shell binder comprises one of an aqueous fluid or a phosphoric acid.

13. The solid freeform fabrication system of claim 1, said computing device further configured to operate said dispensing and curing systems to produce an object having a core with flexural strength; and a smooth shell coating a surface of said core.

14. The solid freeform fabrication system of claim 1, wherein said dispensing system comprises a number of material dispensers and said solid freeform fabrication system utilizes a higher number of said material dispensers to dispense said core binder than said shell binder when more of said core binder is needed to form said three-dimensional object than said shell binder.

15. The solid freeform fabrication system of claim 1, wherein said dispensing system comprises a number of material dispensers and said solid freeform fabrication system utilizes a higher number of said material dispensers to dispense said shell binder than said cure binder when more of said shell binder is needed to form said three-dimensional object than said core binder.

* * * * *

UNITED STATES PATENT AND TRADEMARK OFFICE
CERTIFICATE OF CORRECTION

PATENT NO.          : 8,540,505 B2                            Page 1 of 1
APPLICATION NO.     : 12/891185
DATED               : September 24, 2013
INVENTOR(S)         : Isaac Farr et al.

It is certified that error appears in the above-identified patent and that said Letters Patent is hereby corrected as shown below:

In the Claims

In column 10, line 52, in Claim 1, delete "to as" and insert -- so as --, therefor.

Signed and Sealed this
Third Day of December, 2013

Margaret A. Focarino
*Commissioner for Patents of the United States Patent and Trademark Office*